1364490
1364491

G. G. FLOYD AND W. S. TROWBRIDGE.
MEANS FOR CONNECTING TRUCK SIDE FRAMES AND JOURNAL BOXES.
APPLICATION FILED DEC. 22, 1919.
1,364,492.
Patented Jan. 4, 1921.
2 SHEETS—SHEET 2.
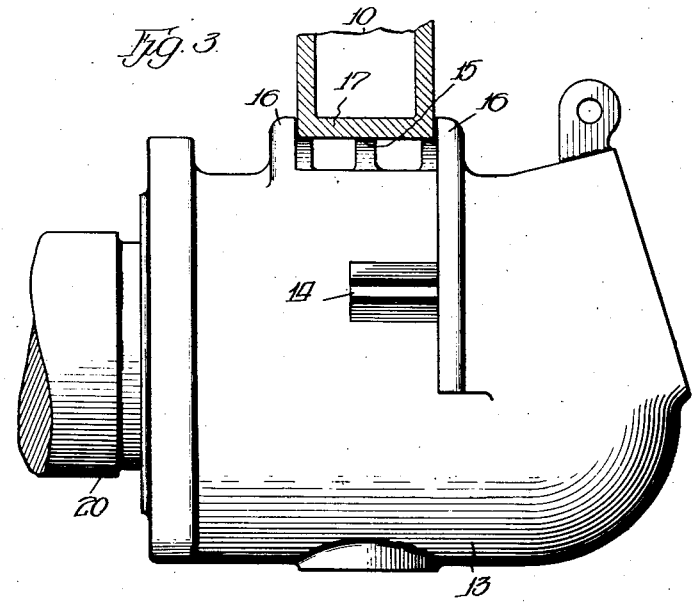
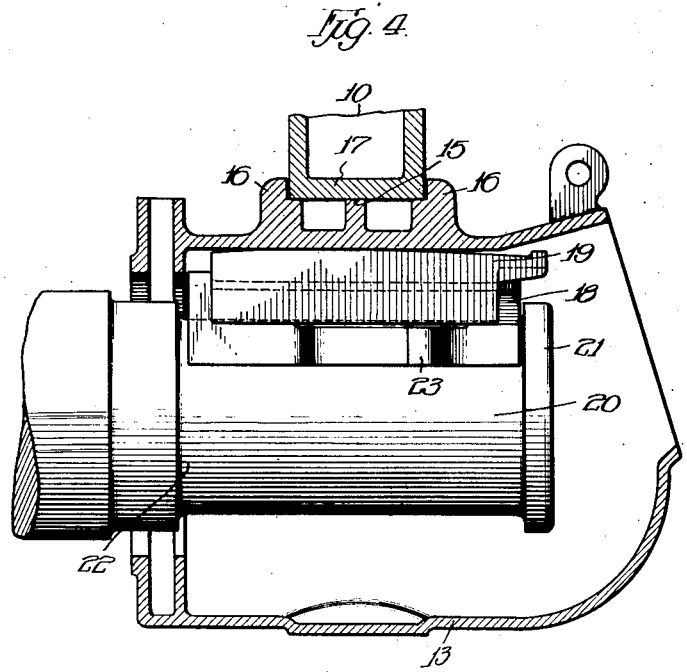

UNITED STATES PATENT OFFICE.

GEORGE G. FLOYD AND WILLIAM S. TROWBRIDGE, OF CHICAGO, ILLINOIS, ASSIGNORS TO AMERICAN STEEL FOUNDRIES, OF CHICAGO, ILLINOIS, A CORPORATION OF ILLINOIS.

MEANS FOR CONNECTING TRUCK SIDE FRAMES AND JOURNAL-BOXES.

1,364,492.     Specification of Letters Patent.     Patented Jan. 4, 1921.

Application filed December 22, 1919. Serial No. 346,665.

*To all whom it may concern:*

Be it known that we, GEORGE G. FLOYD and WILLIAM S. TROWBRIDGE, citizens of the United States, residing at Chicago, in the county of Cook and State of Illinois, have jointly invented certain new and useful Improvements in Means for Connecting Truck Side Frames and Journal-Boxes, of which the following is a specification.

This invention relates to means for connecting truck side frames and journal boxes.

One object is to detachably connect the truck side frame and journal box in a simple and novel manner whereby same cannot be disconnected accidentally.

Another object is to provide a truck side frame and journal box which may be connected and disconnected quickly without the use of the usual bolts, etc., and without increasing the weight of the parts in question.

Another object is to provide a truck side frame and journal box construction whereby same may be readily connected and disconnected in a manner to meet all of the requirements for successful commercial operation.

These and other objects are accomplished by means of the arrangement disclosed on the accompanying sheets of drawings, in which—

Figure 1 is a fragmentary longitudinal sectional view of a truck side frame showing a sectional view in the same plane of a journal box and means for connecting the latter to the side frame;

Fig. 2 is a sectional view taken in the plane of line 2—2 of Fig. 1;

Fig. 3 is a side elevation of the journal box showing a portion of the side frame in section; and, Fig. 4 is a longitudinal vertical sectional view of the journal box showing the arrangement of associated parts.

The various novel features of our invention will be apparent from the following description and drawings and will be particularly pointed out in the appended claims.

Heretofore it has been customary in some instances to connect the side frame and journal box by bolts in a manner such that if the car were tipped over and thrown beyond the tracks, the trucks, including the side frames, wheels and journal boxes, would go with the car. Such connection between the side frames and journal boxes also serves to facilitate the handling of assembled trucks when moved by a crane from one position to another, for instance, in shops. Under normal operating conditions the bolted connection between the side frames and journal boxes serves no particular function in some pedestal types of trucks.

In this particular application we have provided means for connecting truck side frames and journal boxes whereby the same cannot be accidentally disconnected, but at the same time may be readily connected and disconnected when the same becomes necessary.

Referring to the figures of the drawings, and particularly to Fig. 1, it will be noted that we have provided a truck side frame 10 having pedestal jaws 11 provided with elongated vertical slots 12 which also are elongated in a horizontal direction, as shown in Fig. 2. Mounted between the pedestal jaws 11 is a journal box 13 having at the sides thereof lugs 14 which are received by the slots 12 and are of such a vertical dimension to permit the journal box 13 to have a relative vertical movement with respect to the side frame 10. This permitted vertical movement is slightly in excess of the distance between the tops of ribs 15 formed on top of the journal box and the tops of gibs 16 also formed on top of the journal box. Normally, when the side frame rests on top of the journal box, the journal box is prevented from being removed laterally from the side frame because the side frame is located down between the box gibs 16. If for any reason the side frame is raised relatively to the boxes, the gib-engaging portion 17 of the side frame 10 will clear the gibs 16 when the lugs 14 occupy the lower portions of the slots 12 and engage the floor portions thereof. The journal boxes, however, are prevented from falling vertically out of the pedestal jaws 11 with the parts in this position, because of the engagement between the lower parts of the lugs 14 and the floor portions of the slots 12. It will be understood, however, that so far as the gibs 16 are concerned, the journal box 13 may be moved laterally out of engagement with the side frame under the conditions mentioned. However, such lateral removal of the journal box from the side frame is not possible unless the journal brass 18 and wedge 19 are removed, for by referring to Figs. 2 and 4, it will be noted that the brass 18 cannot move any effectual amount laterally with respect to the journal 20 under the conditions imposed because of the journal collar 21 and shoulder 22, and because said brass has shoulders 23 which are adapted to engage shoulders 24 on the journal box. If, however, the side frame is raised an increased amount and the journal box raised a given amount so that the journal takes a lower position with respect to the journal box, then the wedge and brass may be removed, whereupon the journal box may be moved laterally outwardly with respect to the side frame. When the journal box has been moved laterally outwardly to such an extent that the lower parts of the lugs 14 no longer engage the floor of the slots 12, the journal box will drop vertically out of the side frame. The length of the journal box lugs 14 is indicated in Figs. 2 and 3, and in view of the fact that this distance is greater than any amount the brass could normally move between the journal collar 21 and shoulder 22, it would be practically impossible to remove the journal box from the side frame with the brass and wedge in normal operating position. To place the journal box back into the side frame the operation is reversed. By means of this arrangement the side frame and journal box may be connected and disconnected with comparative ease and rapidity and at the same time accidental disconnection of the parts in question is quite impossible.

It is our intention to cover all modifications of the invention falling within the spirit and scope of the following claims.

We claim:

1. In a railway truck a side frame having open jaws with slots therein, a journal box having gibs formed thereon between which a portion of the side frame may be received for normally preventing said side frame and journal box from being disconnected by a relative lateral movement, means whereby said side frame and journal box are prevented from being disconnected when the journal brass and wedge are in their normal position, and ribs on the journal box operable in said slots normally to prevent relative vertical disengaging movement.

2. In a railway truck a side frame having open jaws one with a slot therein, a journal box having gibs formed thereon between which a portion of the side frame may be received for normally preventing said side frame and journal box from being disconnected by a relative lateral movement, means whereby said side frame and journal box are prevented from being disconnected when the journal brass is in its normal position, and a rib on the journal box operable in said slot normally to prevent relative vertical disengaging movement.

3. In a railway truck, a side frame, a journal box having gibs between which the side frame normally rests to prevent relative lateral movement of the side frame and journal box, said side frame having jaws with laterally extending slots therein, said journal box being mounted within said jaws and having lugs vertically and horizontally movable within said slots, the vertical movement being sufficient to free the side frame from said gibs whereby the journal box and side frame may have a relative lateral movement for changing the connection between same, and a journal brass and wedge which must be removed from their normal positions to permit relative lateral movement between said side frame and journal box.

4. In a railway truck a side frame, and a journal box having gibs between which the side frame normally rests to prevent relative lateral movement of the side frame and journal box, said side frame having jaws with laterally extending slots therein, said journal box being mounted within said jaws and having lugs vertically and horizontally movable within said slots, the vertical movement being sufficient to free the side frame from said gibs whereby the journal box and side frame may have a relative lateral movement for changing the connection between same.

Signed at Chicago, Illinois, this 19th day of Dec., 1919.

GEORGE G. FLOYD.
WILLIAM S. TROWBRIDGE.